United States Patent
Crankshaw et al.

(10) Patent No.: US 8,890,377 B2
(45) Date of Patent: Nov. 18, 2014

(54) MOUNTING ARRANGEMENT FOR AN ELECTRICAL MACHINE

(75) Inventors: Paul D. Crankshaw, Bedworth (GB); Gareth J. Roberts, Derby (GB); Ian Hood, Derby (GB)

(73) Assignees: Rolls-Royce PLC, London (GB); Rolls-Royce Power Engineering PLC, Derby (GB)

( * ) Notice: Subject to any disclaimer, the term of this patent is extended or adjusted under 35 U.S.C. 154(b) by 94 days.

(21) Appl. No.: 13/071,087

(22) Filed: Mar. 24, 2011

(65) Prior Publication Data

US 2011/0254390 A1  Oct. 20, 2011

(30) Foreign Application Priority Data

Apr. 16, 2010 (GB) .................................. 1006329.5

(51) Int. Cl.
*H02K 5/24* (2006.01)
*H02K 1/18* (2006.01)

(52) U.S. Cl.
CPC . *H02K 5/24* (2013.01); *H02K 1/185* (2013.01)
USPC .................. 310/51; 310/89; 310/91

(58) Field of Classification Search
CPC ....................................................... H02K 5/24
USPC ............................................... 310/51, 89, 91
IPC ....................................................... H02K 5/24
See application file for complete search history.

(56) References Cited

U.S. PATENT DOCUMENTS

| | | | | |
|---|---|---|---|---|
| 2,611,797 A | * | 9/1952 | Beckwith et al. | 310/51 |
| 2,720,600 A | * | 10/1955 | Pollard | 310/51 |
| 2,874,008 A | * | 2/1959 | Orte et al. | 384/536 |
| 3,278,773 A | * | 10/1966 | Mikina | 310/51 |
| 4,135,390 A | * | 1/1979 | Templin | 73/862.326 |
| 4,602,176 A | * | 7/1986 | Baker | 310/51 |
| 5,497,039 A | * | 3/1996 | Blaettner et al. | 310/51 |
| 5,917,258 A | * | 6/1999 | Kershaw et al. | 310/51 |
| 6,091,177 A | | 7/2000 | Carbonell et al. | |

(Continued)

FOREIGN PATENT DOCUMENTS

| | | |
|---|---|---|
| DE | 657 790 C | 3/1938 |
| EP | 1 143 599 A2 | 10/2001 |

(Continued)

OTHER PUBLICATIONS

British Search Report issued in Application No. 1006329.5; Dated Aug. 17, 2010.
Mar. 26, 2014 Search Report issued in European Patent Application No. 11 15 9533.

*Primary Examiner* — Quyen Leung
*Assistant Examiner* — Thomas Truong
(74) *Attorney, Agent, or Firm* — Oliff PLC

(57) ABSTRACT

A mounting arrangement for locating a stator (10) within a casing (16) of a rotating machine comprises at least one mounting plate (12) adapted to engage with the stator (10) and the casing (16). The mounting plate (12) has a series of discrete apertures (20) therein. The apertures (20) extend through the plate (12) and are arranged in an array to provide a convoluted path which impedes the transmission of the dynamic forces through the plate (12) and into the casing (16). The apertures (20) render the plate (12) more resilient to the dynamic forces that the stator (10) experiences in operation. Each aperture (20) divides the plate (12) into portions which provide anisotropic stiffness in the radial and tangential directions.

20 Claims, 4 Drawing Sheets

(56) References Cited

U.S. PATENT DOCUMENTS

| | | | | |
|---|---|---|---|---|
| 6,107,705 | A * | 8/2000 | Durantay et al. | 310/51 |
| 6,129,176 | A * | 10/2000 | Hunsberger et al. | 181/202 |
| 6,563,239 | B1 * | 5/2003 | Baer et al. | 310/51 |
| 6,946,754 | B2 * | 9/2005 | Inagaki et al. | 310/12.25 |
| 7,598,641 | B2 * | 10/2009 | Baumgartner et al. | 310/90 |
| 2003/0173837 | A1 | 9/2003 | Fujigaki et al. | |
| 2004/0061396 | A1 * | 4/2004 | Narita et al. | 310/112 |
| 2009/0302696 | A1 | 12/2009 | Beck et al. | |

FOREIGN PATENT DOCUMENTS

| | | |
|---|---|---|
| EP | 1 835 596 A2 | 9/2007 |
| FR | 1 065 467 A | 5/1954 |
| GB | 1 304 898 A | 1/1973 |
| GB | 2 392 014 A | 2/2004 |
| JP | S-63-167349 A | 7/1988 |
| JP | A-09-233762 | 9/1997 |
| WO | WO 2004/045995 A1 | 6/2004 |

* cited by examiner

MOUNTING ARRANGEMENT FOR AN ELECTRICAL MACHINE

The present invention relates to a mounting arrangement for an electrical machine and in particular to a mounting plate for a stator of a rotary electric machine.

Rotary electric machines comprise a rotor and a stator mounted coaxial within a casing. The rotor rotates within the stator which is supported from the casing. Dynamic forces are exerted on the stator as the rotor rotates and these forces are transmitted from the stator through the casing causing noise and vibration.

The way in which the stator is mounted within the casing will determine how much noise and vibration is transmitted to the casing. Known mounting systems include suspending the stators from beams within the casing or alternatively securing the stator at a number of discrete locations around the periphery of the stator. Both of these mounting arrangements minimise the contact area between the stator and the casing and thus reduce the amount of noise and vibration transmitted into the casing.

In other known arrangements, see for example U.S. Pat. No. 6,091,177 and U.S. Pat. No. 6,107,705, spring damping mechanisms are used at the attachment points to absorb the dynamic forces and reduce vibration transmission into the casing. In GB 2,392,014 a yoke and non-rigid connections are used to transfer radial deflections into rocking movement and thus prevent the transmission of noise and vibration into the casing.

The present invention seeks to provide an improved mounting arrangement for a stator in which the dynamic forces are attenuated within a mounting plate to reduce the amount of noise and vibration transmitted into the casing. A mounting arrangement in accordance with the present invention can also accommodate sudden shock loads caused by fault events or other external factors.

According to the present invention a mounting arrangement for locating a stator within a casing of a rotating machine comprises at least one mounting plate adapted to engage with the stator and the casing, the plate having a series of discrete apertures therein, the apertures extending through the plate and being arranged in an array to provide a convoluted path to impede the transmission of forces through the plate and into the casing.

The provision of a number of discrete apertures in the plate renders it more resilient to the dynamic forces that the stator experiences in operation. The apertures are arranged in an array to provide a convoluted path for the dynamic forces passing through the plate. The convoluted force path causes the attenuation of the loads in the plate minimising the amount of noise and vibration transmitted into the stator casing.

In the preferred embodiment of the present invention each discrete aperture overlaps the adjacent apertures and the apertures are arranged adjacent the outer periphery of the plate.

The plate may be annular and the apertures are arranged in a circumferential array to prevent the transmission of forces radially outwards through the annular plate and into the casing.

More than one circumferential array of apertures may be provided in the plate to provide a more convoluted force path to increase attenuation of the forces.

Preferably each discrete aperture has a radial and a tangential portion. The dimensions of the radial portion and the tangential portion are chosen so that the apertures can attenuate or absorb the shock loads caused by short circuit events, faults or other shock loads generated from an external event, such as an earthquake or explosion.

The apertures may be provided with additional features for locating the end of stator bars used in stator assemblies.

A number of plates may be provided around the stator however in the preferred embodiment of the present invention two plates are provide at either end of the stator and additional features are provided in both plates for locating opposite ends of the stator bars which extend along the length of the stator.

The plates may be made from a homogenous material such as stainless steel and a reinforced interference fit is provided between the plate and the stator.

The present invention will now be described with reference to the figures in which.

Figure 1:
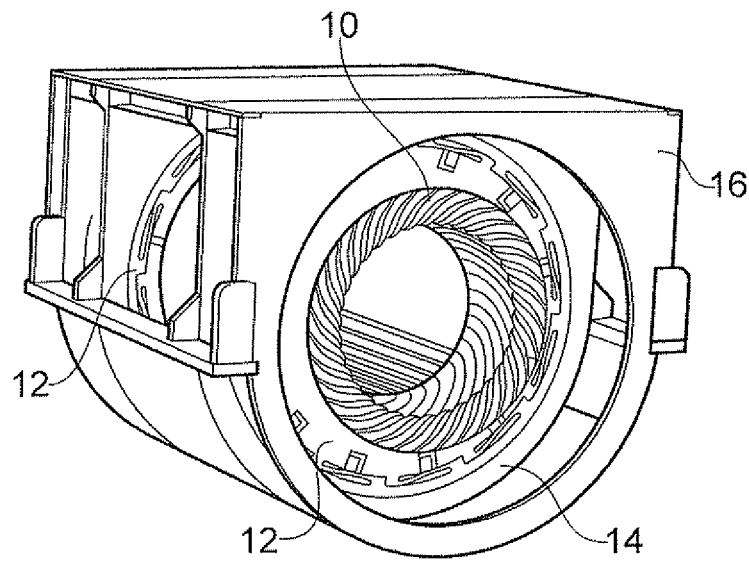
FIG. 1 is a pictorial view of an electrical machine mounted in accordance with the present invention.

Referring to FIG. 1 a rotor (not shown) is coaxially mounted within a stator 10. An annular mounting plate 12 is provided at either end of the stator 10, FIG. 1, and encloses the stator 10. The mounting plate 12 supports the stator 10 and connects the stator 10 to a bulkhead 14 which forms part of an outer machine casing 16.

The annular mounting plate 12 is made from a single homogeneous piece of material such as stainless steel. Material is removed from the plate 12 at a number of locations to form a series of discrete apertures 20, FIG. 2. The apertures 20 extend all the way through the plate 12 and are arranged circumferentially adjacent the outer edge 13 of the plate 12.

Figure 3:
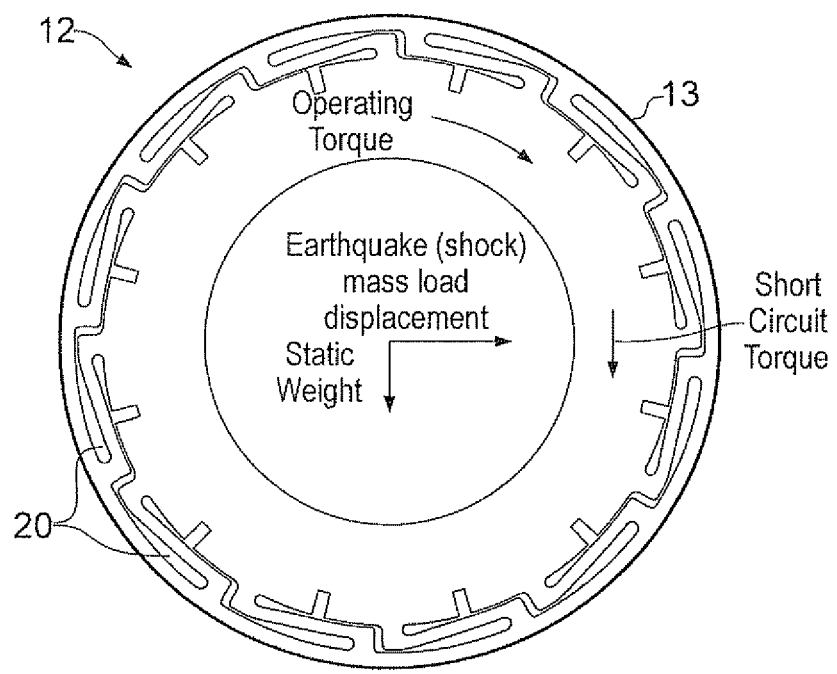
FIG. 3 shows the operational loads acting on the mounting plate shown in FIG. 2.

The apertures 20 act as spring members and render the plate 12 resilient. Each aperture 20 is shaped so that it can compensate for any dynamic forces transmitted into the plate 12 from the stator 10. FIG. 3 shows the loads acting on the plate 12. To compensate for these loads each aperture 20 has anisotropic stiffness in a radial and a tangential direction.

The tangential stiffness of each aperture 20, KT, needs to be sufficient to compensate for machine torque and part of the static weight so that the stator 10 can maintain the correct position around the rotors axis of rotation.

The radial stiffness of each of the apertures 20, KR, needs to be sufficient to take a proportion of the static weight of the stator 10 and to compensate for any radial vibration forces.

Figure 2:
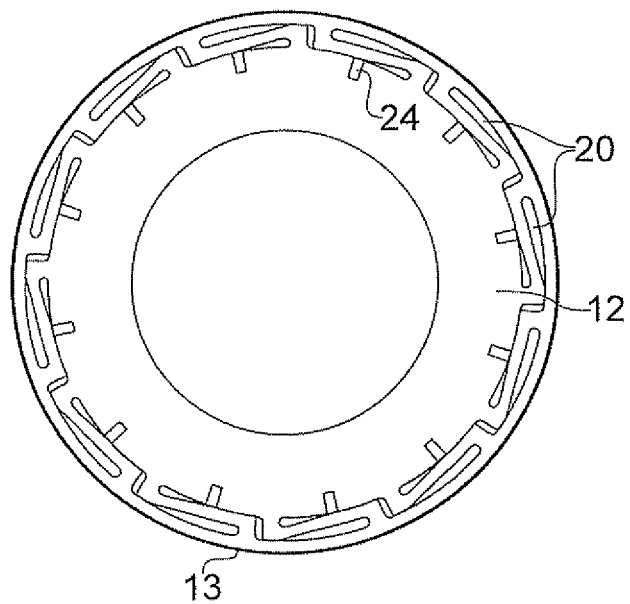
FIG. 2 is a view of a mounting plate in accordance with a first embodiment of the present invention.

In the preferred embodiment of the present invention shown in FIGS. 2 & 3 the apertures 20 overlap one another to impede the transmission of vibration directly into the bulkhead 14 and casing 16. Any radial forces are directed around the apertures 20 in a convoluted path and are absorbed by the apertures 20. This convoluted path causes attenuation of the forces within the plate 12 before they reach the interfaces with the bulkhead 14 and the casing 16. This results in a reduction in the noise and vibration that passes from the machine into the bulkhead 14 and casing 16.

Figure 4:
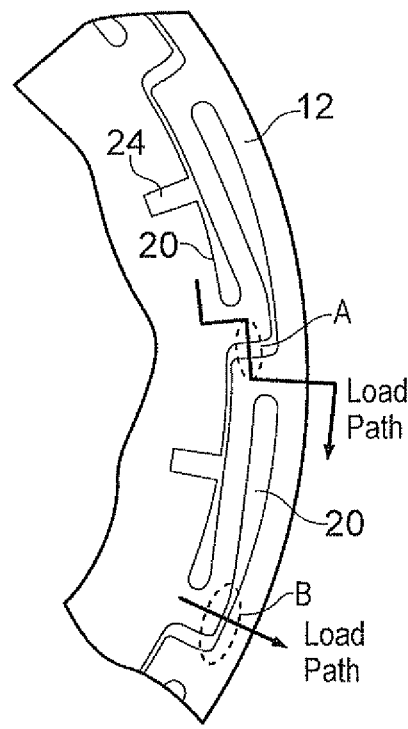
FIG. 4 is an enlarged view of part of the mounting plate shown in FIGS. 2 and 3 showing the load paths through the apertures in the mounting plate.

Referring to FIG. 4 the individual apertures 20 have a radial portion, region A, and a tangential portion region B. Regions A and B are provided to manage any extraordinary loads which may permanently damage the plate 12.

Region A in FIG. 4 compensates for torque loads which are generated when a fault occurs. When a fault occurs the torque loads generated cause the aperture 20 in region A to diminish until contact is made between the opposing faces and the aperture 20 closes.

The region B in FIG. 4 compensates for dynamic mass loads which may occur during an earthquake or similar external event. In these conditions the dynamic forces are such that the apertures elastically deform in region B until opposing sides contact one another. The aperture 20 closes in region B to establish a direct load path to the bulkhead 14 and the machine casing 16, thus preventing plastic deformation and permanent damage to the plate 12.

In the preferred embodiment of the present invention twelve apertures 20 are provided adjacent the outer edge 13 of the plate 12 which has a reinforced interference fit with the bulkhead 14.

Two mounting plates 12 are provided one at either end of the stator 10 and stator bars (not shown) extend along the length of the stator 10 between the plates 12. The stator bars maintain a compressive force on the laminations of the stator core 10. Further apertures 24, are provided in each of the plates 12 for the location of the ends of the stator bars.

It will be appreciated by one skilled in the art that any number of mounting plates 12 may be used along the length of the stator 10 depending on the application. Different numbers and arrangements of the apertures 20 may also be used to attenuate the dynamic loads within the mounting plate 12 depending on the vibration characteristics of the machine.

Figure 5:
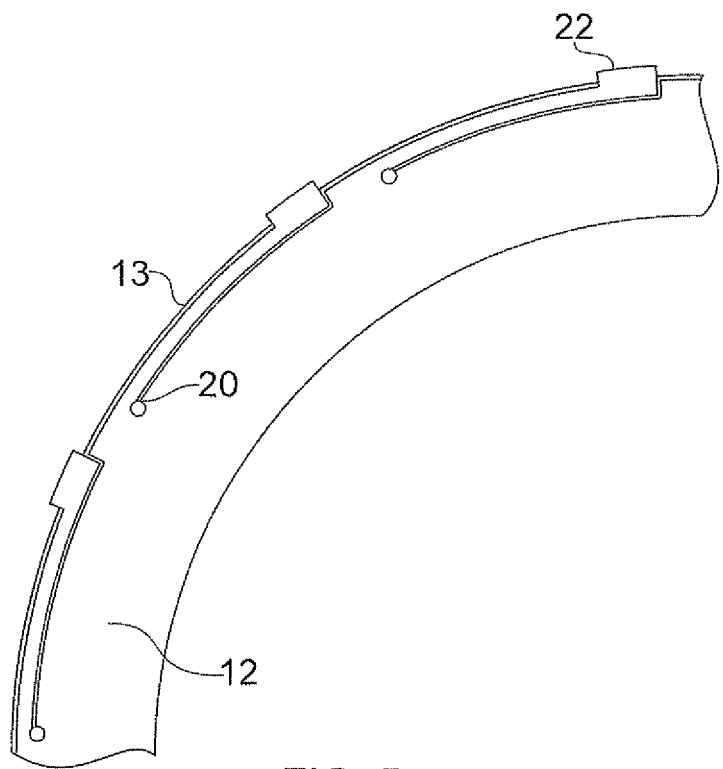
FIG. 5 is a pictorial view of a mounting plate in accordance with a second embodiment of the present invention.

In one of the alternative embodiments shown in FIG. 5 the apertures 20 are shaped like hockey sticks. The apertures are formed by drilling a hole and then producing a wire cut slot however alternative manufacturing techniques could be used. The ends 22 of the hockey sticks protrude proud of the outer edge 13 of the plate 12 and form a number discrete mounting features which locate in corresponding notches in the bulkhead 14, leading to a further reduction in the loads transmitted into the machine casing 16.

Figure 6:
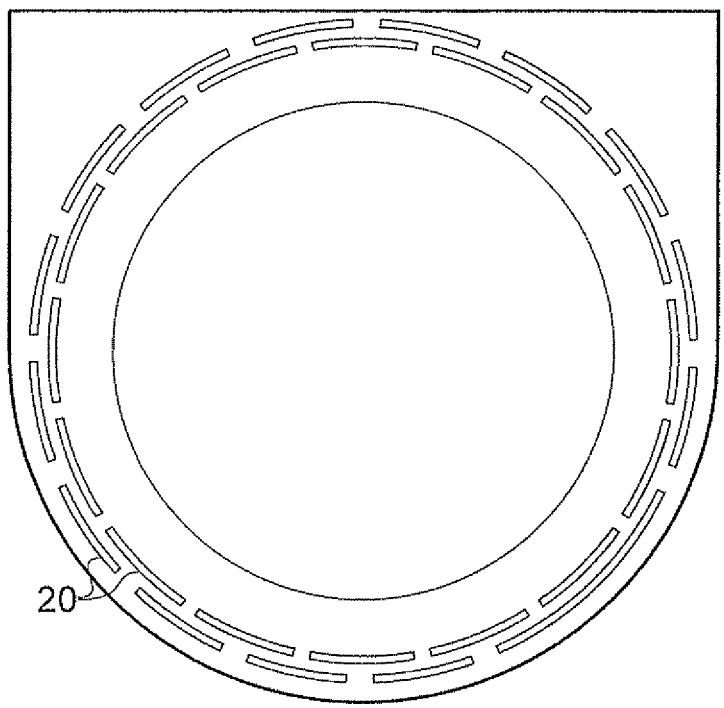
FIG. 6 is a pictorial view of a mounting plate in accordance with a third embodiment of the present invention.

In a further embodiment shown in FIG. 6 the bulkhead 14 is formed integrally with the plate 12 and the apertures 20 are slots. A minimum of two circumferential arrays of slots are provided to provide a convoluted load path and prevent the transmission of vibration from the combined plate 12 and bulkhead 14 into the machine casing 16.

Figure 7:
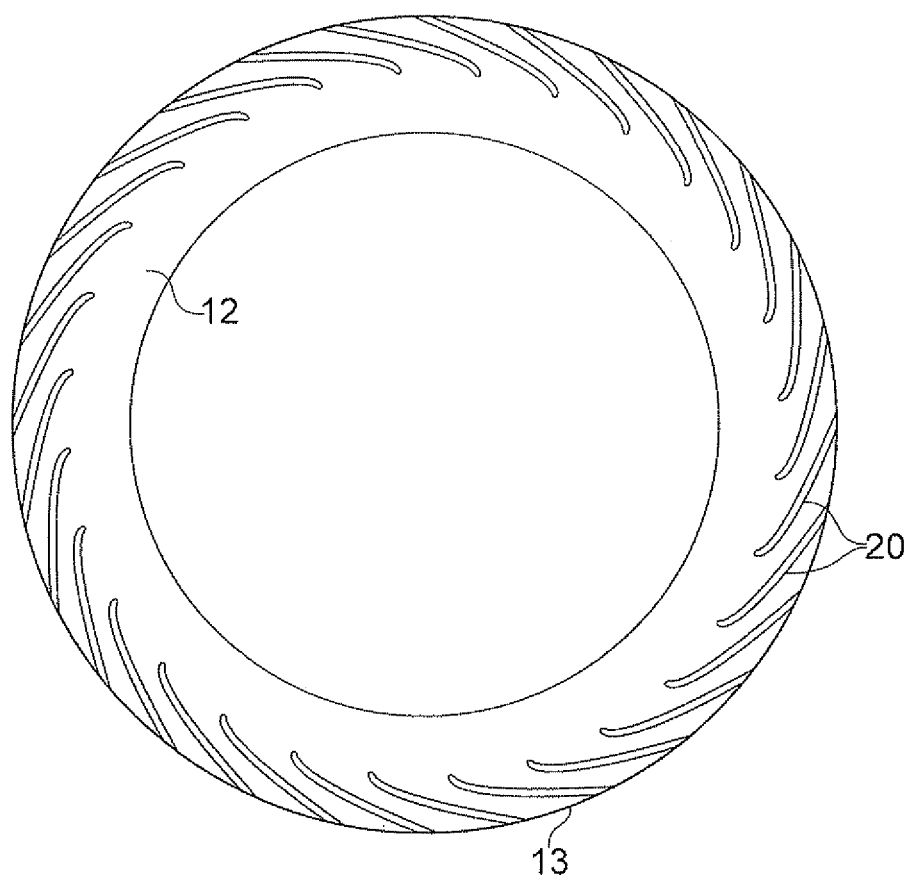
FIG. 7 is a pictorial view of a mounting plate in accordance with a forth embodiment of the present invention.

In yet another embodiment shown in FIG. 7 the apertures 20 are slots which extend to the outer edge 13 of the plate 12. This enables easy manufacture as the slots 20 are cut inwardly from the outer edge 13 of the plate 12.

In all of the embodiments described the provision of a number of discrete apertures 20 in each mounting plate 12 renders it more resilient to the dynamic forces that the stator 10 experiences in operation. Each aperture (20) has a radial and a tangential portion which provides anisotropic stiffness in the radial and tangential directions. The apertures 20 are arranged in an array to provide a convoluted path for the dynamic forces that pass through the plate 12. The convoluted force path causes the attenuation of the loads in the plate 12 minimising the amount of noise and vibration transmitted to the machine casing 16.

The invention claimed is:

1. A mounting arrangement for locating a stator within a casing of a rotating machine, comprising:
   at least one mounting plate adapted to engage with the stator and the casing, the mounting plate having a series of discrete apertures therein that each include a radial portion and a tangential portion, the apertures extending through the mounting plate and being arranged to provide a convoluted path to impede the transmission of forces through the mounting plate, each of the apertures defining at least one of the following configurations: 1) the radial and tangential portions intersect at substantially a 90 degree angle, and 2) the tangential portion intersects an end of the radial portion and another tangential portion intersects an opposing end of the radial portion to define a Z-shaped configuration.

2. The mounting arrangement as claimed in claim 1, wherein the adjacent apertures overlap one another.

3. The mounting arrangement as claimed in claim 1, wherein the mounting plate defines an outer edge, and the apertures are arranged adjacent the outer edge of the mounting plate.

4. The mounting arrangement as claimed in claim 1, wherein the mounting plate is annular and the apertures are arranged in at least one circumferential array.

5. The mounting arrangement as claimed in claim 1, wherein the mounting plate is annular and the apertures are arranged in a plurality of circumferential arrays.

6. The mounting arrangement as claimed in claim 1, wherein the at least one mounting plate includes one mounting plate provided at either end of the stator.

7. The mounting arrangement as claimed in claim 1, wherein the at least one mounting plate includes one mounting plate provided at either end of the stator and additional apertures are provided in the mounting plate for locating ends of stator bars.

8. The mounting arrangement as claimed in claim 1, wherein the mounting plate is made from a homogenous material.

9. The mounting arrangement as claimed in claim 1, further including a reinforced interference fit provided between the mounting plate and the stator.

10. The mounting arrangement as claimed in claim 1, further including a number of discrete mounting features provided between the mounting plate and the stator.

11. A mounting arrangement for locating a stator within a casing of a rotating machine, comprising:
    at least one mounting plate adapted to engage with the stator and the casing, the mounting plate having a series of discrete apertures therein that each include a radial portion and a tangential portion, the apertures extending through the mounting plate and being arranged to provide a convoluted path to impede transmission of forces through the mounting plate, each of the apertures defining a Z-shaped configuration wherein the tangential portion intersects an end of the radial portion and another tangential portion intersects an opposing end of the radial portion.

12. A mounting arrangement for locating a stator within a casing of a rotating machine, comprising:
    at least one mounting plate adapted to engage with the stator and the casing, the mounting plate having a series of discrete apertures therein that each include a radially-extending portion and a tangentially-extending portion, the apertures extending through the mounting plate and being arranged to provide a convoluted path to impede transmission of forces through the mounting plate, each of the apertures defining at least one of the following configurations: 1) the radially-extending and tangentially-extending portions intersect at substantially a 90 degree angle, and 2) the tangentially-extending portion intersects an end of the radially-extending portion and another tangentially-extending portion intersects an opposing end of the radially-extending portion to define a Z-shaped configuration, the radially-extending portion being deformable in the tangential direction.

13. The mounting arrangement as claimed in claim 12, wherein the adjacent apertures overlap one another.

14. The mounting arrangement as claimed in claim 12, wherein the mounting plate defines an outer edge, and the apertures are arranged adjacent the outer edge of the mounting plate.

15. The mounting arrangement as claimed in claim 12, wherein the mounting plate is annular and the apertures are arranged in at least one circumferential array.

16. The mounting arrangement as claimed in claim 12, wherein the mounting plate is annular and the apertures are arranged in a plurality of circumferential arrays.

17. The mounting arrangement as claimed in claim 12, wherein the at least one mounting plate includes one mounting plate provided at either end of the stator.

18. The mounting arrangement as claimed in claim 17, wherein the at least one mounting plate includes additional apertures in the mounting plate for locating ends of stator bars.

19. The mounting arrangement as claimed in claim 12, further including a reinforced interference fit provided between the mounting plate and the stator.

20. The mounting arrangement as claimed in claim 12, further including a number of discrete mounting features provided between the mounting plate and the stator.

\* \* \* \* \*